Sept. 24, 1968   R. P. OGDEN ET AL   3,403,034
METHOD OF PROCESSING AND PACKAGING MILK
Filed Jan. 9, 1967
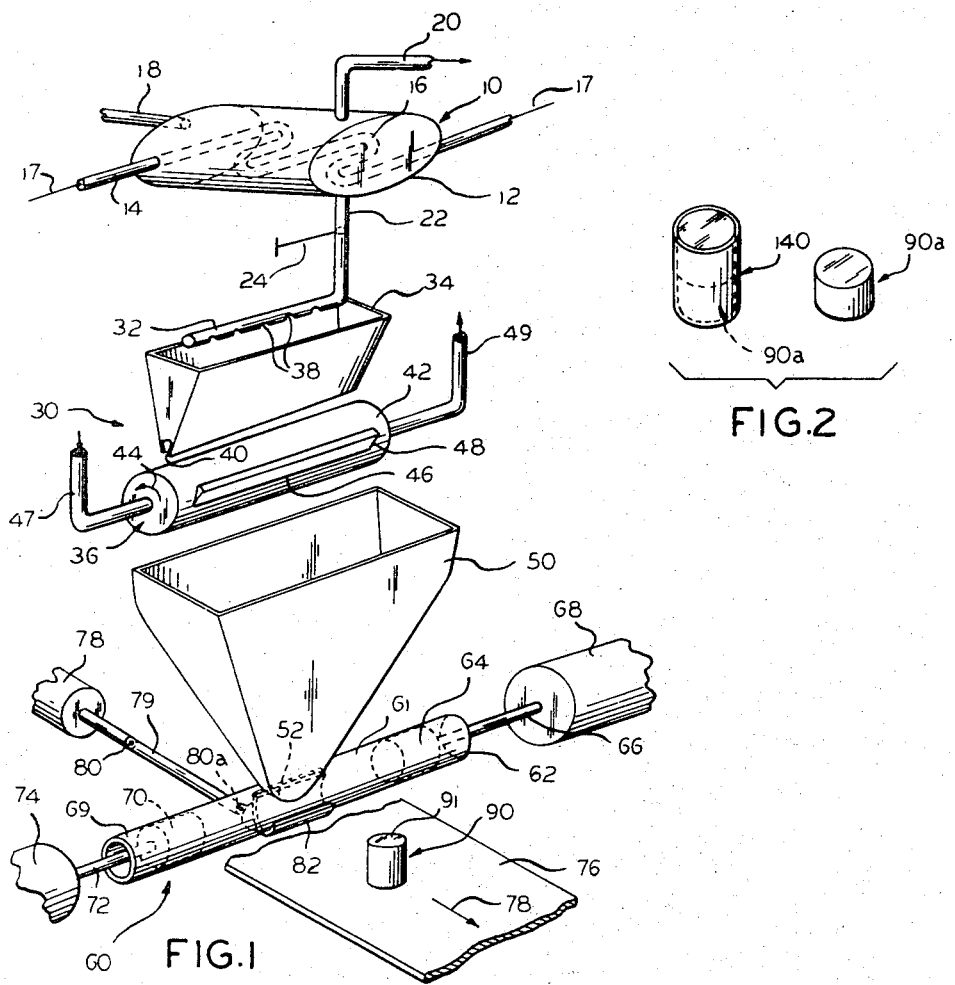
INVENTORS
RALPH P. OGDEN
WILLIAM P. LAWSON
BY
ATTORNEYS United States Patent Office 3,403,034
Patented Sept. 24, 1968

3,403,034
METHOD OF PROCESSING AND
PACKAGING MILK
Ralph P. Ogden, Hammond, Ind. (19 Bender St., Park Forest, Ill. 60466), and William P. Lawson, 7522 Walnut St., Hammond, Ind. 46324
Continuation-in-part of application Ser. No. 507,623, Oct. 22, 1965, which is a continuation-in-part of application Ser. No. 167,694, Jan. 22, 1962. This application Jan. 9, 1967, Ser. No. 608,122
The portion of the term of the patent subsequent to Jan. 10, 1984, has been disclaimed
2 Claims. (Cl. 99—200)

ABSTRACT OF THE DISCLOSURE

The disclosure pertains to a method of processing and packaging milk which involves partially concentrating the milk, flash freezing said milk to form a film of solid concentrate, fragmenting the frozen film, compacting the solid concentrate fragments into cakes, and packaging one or more of the cakes in a container.

---

This application is a continuation-in-part of our application Ser. No. 507,623, filed Oct. 22, 1965, now Patent No. 3,297,455, granted Jan. 10, 1967, which was a continuation-in-part of our abandoned application Ser. No. 167,694, filed Jan. 22, 1962.

Our invention relates to a method of freezing liquid products. The term "liquid product" as used herein includes slurries, emulsions, solutions, and mixtures which are susceptible to the method of the invention. The invention will be exemplified as applied to thoroughly mixed fresh whole milk or to homogenized fresh whole milk to produce on an economical basis a dried milk product that in its reconstituted form is fully as palatable as the original, or alternatively, a frozen whole milk product that is adapted for ready packaging and wide distribution.

At the present time, the producing and marketing of milk is closely tied in geographically with the location of its market area because of the high water content in milk and the consequent critical requirements for refrigeration, which prevent it from being shipped long distances as a fresh product. While highly concentrated and dehydrated milk is marketed to a limited extent, whole fresh milk continues to be the form primarily demanded by the utlimate consumer.

There have been many efforts to dehydrate milk to a highly concentrated or dried form for facilitating its packaging and merchandising, but insofar as we are aware, no practical way has been found to eliminate the unpalatableness of highly concentrated or dried milk. Highly concentrated or dried milk, when reconstituted by adding water, substitutes quite well nutritionally for the fresh product, but the taste is entirely different and usually considered unpalatable.

Consequently, as a practical matter, the uses of concentrated or dried milk have been confined to instances in which the taste of the highly concentrated or dried milk is sufficiently obliterated to avoid objection from this standpoint.

The change in taste of milk as it is dehydrated and dried can be caused by a number of factors, though it is usually attributable to some caramelization of the milk sugars during the dehydrating and drying processes.

The prior art in the field has long recognized the unpalatableness of highly concentrated or dried milk after reconstitution, and many attempts have been made to overcome this problem by employing ways and means to reduce the temperatures required to sterilize and concentrate the end product. Generally speaking, these attempts involve the use of complicated de-icing and related techniques to remove water from the milk (see, for instance, Patents Nos. 2,248,634 and 2,343,169), and, if complete drying is desired, a spray drying procedure has been employed which necessarily requires involved collection procedures for gathering the resulting particles for packaging purposes; see, for instance, Reissue Patent 24,080 and Patent 2,011,558.

An early variation in this approach is shown in Patent 523,677, in accordance with which the product is first concentrated by freezing out water, then frozen in a thin layer to sterilize it, then flaked off the freezing surface and thawed, after which it is dried as a liquid under vacuum conditions, then molded into cakes that are again flaked or formed into shavings which are subsequently completely dried by contact with warm dry carbonic gas, and then powdered, after which, of course, some collection procedure must be provided for packaging the product.

In contrast, our invention takes an entirely new approach. Our new process contemplates that the fresh product be first partially concentrated by employing conventional procedures to approximately one-third of its volume, after which the resulting concentrate is flash frozen into a thin sheet that is immediately fragmented into flakes or chips. The resulting frozen flakes or chips are then compacted into a cake or block which, in accordance with our above identified application, is then fully dried under vacuum conditions while maintained fully frozen to provide the finished product.

The resulting cake or block is then applied to a suitable container which preferably is proportioned to receive several of the cakes or blocks. The packaged end product is then capable of being merchandised without further handling, and we contemplate that the container used for packaging purposes may be employed by the ultimate consumer to reconstitute the dried milk product to the dilution desired. Vacuum or inert gas packing (both well known in the art) can be used. The dried cakes could be pulverized where it was desirable to market a powdered product.

There are a number of important advantages arising from the practice of our method of our said patent. In the first place, it will be found that the reconstituted product is fully as palatable as the original fresh product, and this, of course, is of critical importance in this art. Furthermore, the milk product is handled as a solid cake or block during the critical drying and packaging processes or procedures, which eliminates the need for complex particle gathering techniques and materially simplifies the problem of insuring appropriate purification standards.

In accordance with the present application, the cake of frozen flakes or chips is not dehydrated, but instead is applied to a suitable container, which preferably is proportioned to receive several of the cakes or blocks, while being maintained under suitable refrigerated conditions, and then the filled containers are merchandized in a manner similar to the procedures used for frozen fruit juice concentrate and the like.

Therefore, a principal object of our present invention is to provide a method of packaging concentrated milk which eliminates the taste loss problems of prior practices.

Another important object of the invention is to provide a method of packaging milk in which the milk is provided in frozen form that avoids any detraction from its palatability.

Further important objects of this invention are to materially simplify and facilitate milk merchandising procedures and to provide a simplified way to freeze milk concentrate and package same.

Other objects of our invention are to provide a simple and economic method and apparatus for providing a frozen milk product; to provide a frozen milk product in a shape which lends itself to ready merchandising procedures and use by the ultimate consumer; and to provide milk processing arrangements which are economical of manufacture, convenient to install, and useable in connection with the processing of a wide variety of grades of milk and milk-like products.

Other objects, uses and advantages will become obvious or be apparent from a consideration of the application drawing and the following detailed description.

In the drawing:

FIGURE 1 is a diagrammatic perspective view illustrating largely in block diagram form several of the apparatus components that may be employed in practicing our invention, arranged to bring out the relation in consecutive order of the initial steps of our method; and FIGURE 2 is a composite diagrammatic perspective view illustrating more particularly one preferred form of the frozen milk product and a suitable merchandising container therefor.

However, it should be distinctly understood that the drawing illustrations are provided primarily to comply with the requirements of the patent code, and that those skilled in the art will readily be able to practice our method using other appropriate apparatus components, and make modifications in the procedures involved, without departing from the scope of the invention.

In practicing our method, fresh whole milk (or homogenized fresh whole milk) is first dehydrated or concentrated to approximately one-half to one-fourth, say one-third, its original volume by employing conventional practices and procedures that avoid caramelization of milk sugars. For this purpose, a conventional low temperature vacuum distillation autoclave or drying vessel unit may be employed for both dehydration and sterilizing purposes, and such a unit is generally indicated at 10 in FIGURE 1. The autoclave illustrated is shown as including a suitable container 12 which is heated by electrical heating coil portion 16 (connected to a source of electrical power by leads 17) within the tank 12, with the raw milk product being supplied through a suitable inlet 18 and moisture being drawn off through a suitable conduit 20 by employing an appropriate blower or other conventional apparatus customarily employed for this purpose.

When the milk within the autoclave 10 has been brought to approximately the concentration indicated, it is discharged through outlet conduit 22 by operating suitable valve 24, whereupon the concentrated liquid proceeds to suitable apparatus for freezing it in accordance with our method.

A suitable freezing apparatus is diagrammatically indicated at 30 in FIGURE 1, wherein it will be seen that the liquid passes from conduit 22 into an elongate discharge conduit 32 that is horizontally disposed above an elongate funnel-shaped member 34 positioned directly above a rotatably mounted refrigerated cylinder or drum 36. The liquid discharges from discharge conduit 32 through suitable openings 38 into and through the elongate funnel-shaped member 34, which is formed with a narrow elongate outlet opening 40 that extends parallel to the longitudinal axis of cylinder or drum 36 and immediately above same. The liquid passes through the opening 40 in a thin film and directly onto the exterior surface or periphery 42 of drum 36, and drum 36 is refrigerated sufficiently to immediately freeze (flash freeze, as it is known in the art) the liquid into a thin film, or film like sheet, extending lengthwise of the periphery 42 (parenthetically, it is here pointed out that if milk is not rapidly frozen, its fat particles will come out of emulsification, which would detract from the palatability of the end produt; consequently, the milk concentrate must be frozen within a time adequate to prevent the fat particles from coming out of emulsification, which time is well known to those skilled in the art). The cylinder or drum 36 is rotated in the direction indicated by arrow 44, which appiles the now frozen milk film against the elongate knife edge 46 of a doctor blade 48 mounted in any suitable manner with its said edge 46 applied in abutting relation with the periphery 42 of the cylinder or drum 36.

This breaks or fragments the frozen milk film into chips or flakes which then drop under the action of gravity into a funnel 50 that readies the product for the next step in our process. The fragmenting of the film may be insured by applying a suitable comminuting arrangement in funnel 50.

It may be mentioned at this point that the refrigerated drum or cylinder 36 may be of any conventional type and this type of apparatus is well known commercially and in the prior art. Of course, the drum or cylinder 36 may be mounted for rotation in any suitable manner (not illustrated) and it may be refrigerated in any suitable manner. Conduits 47 and 49 are intended to represent any convenient way of getting the refrigerant to and from an appropriate refrigerating system.

It is here pointed out that the primary objective is to flash freeze the milk in as few microseconds as is practical, and that this may be achieved in general by providing the greatest possible exposure of the material per mass unit to a heat removing source such as that disclosed. The refrigerated drum arrangement illustrated is one way of achieving this and it can also be achieved by misting or spraying the milk on flat refrigerated plates or belt surfaces and providing some suitable way of fragmenting and removing the frozen milk for application to a funnel 50 or its equivalent. Fast freezing may also be achieved by spraying the milk into a vacuum chamber or onto the surface of a cold liquid, again providing some way of collecting and fragmenting the frozen product for handling as herein described.

The frozen milk chips or flakes that fall into the funnel 50 then drop through the lower open end 52 of the funnel to appropriate apparatus or means for compacting these chips or flakes into a cake or block of suitable configuration consistent with the objects of our invention.

In the showing of FIGURE 1, an appropriate cake or block forming apparatus is generally indicated at 60, and is shown as comprising a tubular forming cylinder 61 having reciprocably mounted in one end 62 thereof an appropriate compacting piston 64 that is actuated through an appropriate piston rod 66 by double acting cylinder 68 that may be hydraulically or pneumatically controlled.

Reciprocably mounted in the other end 69 of the cylinder 61 is an ejecting piston 70 which is operated through an appropriate piston rod 72 by an appropriate type of double acting cylinder 74 that also may be hydraulically or pneumatically controlled.

The cylinder 61 and the apparatus 68 and 74 are mounted in any suitable manner to position the cylinder 61 above a suitable conveyor element 76 that may move in the direction indicated by arrow 78. The conveyor element 76 may be a suitable form of endless belt appropriately trained in the manner well known to the conveyor art.

The undersurface of the tubular cylinder 61 preferably includes a movable or gate section 82 that may be moved between the open and closed positions indicated as by employing hydraulically or pneumatically operated cylinder 78 with link 79 being connected between the two by pins 80 and 80a.

The milk flakes or chips leaving the funnel member 50 drop through the funnel opening 52 into the tubular cylinder 61 onto the movable gate section 82, and after an appropriate pile is formed, the piston 64 is actuated to move such pile against piston 70, which is held against movement, and this compacts the flakes or chips together. This process may be repeated as required to pack the flakes or chips into a cake having a configuration complementing the bore of cylinder 61, and after the resulting cake or block achieves the desired size, the movable section 82 is lowered to open the underside of cylinder 61 and the piston 70 is moved to eject the resulting cake through such opening onto belt 76.

The resulting cake is generally indicated at 90 in the lower portion of FIGURE 1, and after being applied to belt 76, the cakes 90 may be conveyed to a suitable gathering point for application to a drying apparatus equivalent to that generally indicated by reference numeral 100 of FIGURE 2 of our said patent (to which reference may be had for a disclosure of the freeze drying aspects of our method), or, in accordance with the present invention, for application as a completed product to container 140 of FIGURE 2.

Thus, in accordance with the present application, the resulting compacted cake 90 (which is represented at 90a in FIGURE 2 as a one-half size cake) is conveyed to a suitable gathering point for application to containers similar in shape to container 140 of FIGURE 2, while being maintained under appropriate refrigerated conditions to avoid melting. Container 140 has a shape generally complementing the shape of product 90a and is preferably proportioned to hold several of the cakes 90 or 90a, and may be a can of any commercial make. The containers 140 are then merchandised in a manner similar to procedures used for frozen fruit juice concentrate and the like so that the frozen milk cakes will be available for purchase at any grocery store or supermarket, etc., that sells goods of this general class.

The ultimate user can thus keep the frozen milk refrigerated in his refrigerator or freezer until needed, and, when a can 140 containing the frozen product is opened, a cake may be removed and placed in a suitable container for melting and adding of water to bring the milk to the user's desired concentration. Unused cakes 90 or 90a remaining in the can may be returned to the refrigerator or freezer for storage until needed.

The cakes into which the frozen milk fragments are formed may take any convenient shape; for instance, the cakes 90 and 90a may be parallelepiped in configuration, and the parallelepiped configuration and the cylindrical configurations illustrated are preferred because they lend themselves so readily to packaging and merchandising purposes.

The methods of our invention may be employed to process not only milk but other milk-like products such as coffee cream, chocolate milk or drink, coffee cream substitutes, egg nogg, and skim milk (or powdered skim milk and water) with emulsified added oil or fat, e.g., palm oil, coconut oil, peanut oil, cottonseed oil, and sweet butter. Obviously, milks other than cows' milk, such as mothers' milk and goat milk, could be processed by this method. The method of this invention could be useful with many products where the very fast "flash" freeze in a thin layer (e.g., to avoid emulsion breakdown or other separation of the constituents) plus efficient freeze drying in cake form by low cost conducted heat would be helpful. Possible examples would be biologicals (such as plasma), vegetable and fruit juices, slurries (such as banana slurry), mashed potatoes with the milk already in, rubber tree sap (which is an emulsion), and soups.

The foregoing description and the drawings are given merely to explain and illustrate our invention and the invention is not to be limited thereto, except insofar as the appended claims are so limited, since those skilled in the art who have our disclosure before them will be able to make modifications and variations therein without departing from the scope of the invention.

We claim:
1. The method of processing and subsequently packaging a milk product to make it suitable for mass merchandising purposes in a manner similar to canned frozen juice concentrate and the like, which method comprises:
concentrating the product to a volume in the range of from about ½ to about ¼ of its original volume,
flash freeze processing the resulting concentrate to provide fully frozen solid concentrate fragments having a thickness no greater than film proportions by subjecting the concentrate on a maximum exposure per mass unit basis to a heat removing source that effects minimum micro-second solid freezing of the concentrate throughout said thickness, and then fragmenting said film,
compacting the solid concentrate fragments into cakes,
and, while maintaining the cakes in their fully frozen condition, packaging one or more of the cakes in a container proportioned to substantially complement the cakes and suitable as such for retaining said cakes under ambient air conditions that will maintain the solid state of the cakes.
2. The method of processing and subsequently packaging a whole milk product to make whole milk available in a form suitable for mass merchandising purposes in a manner similar to canned frozen juice concentrate and the like without detracting from the palatableness of the milk, which method comprises:
concentrating the milk to a volume in the range of from about ½ to about ¼ of its original volume,
flash freeze processing the resulting concentrate to provide fully frozen solid concentrate fragments having a thickness no greater than film proportions by subjecting the concentrate on a maximum exposure per mass unit basis to a heat removing source that effects minimum micro-second solid freezing of the concentrate throughout said thickness, and then fragmenting said film,
compacting the solid concentrate fragments into cakes,
and, while maintaining the cakes in their fully frozen condition, packaging one or more of the cakes in a container proportioned to substantially complement the cakes and suitable as such for mass merchandising purposes under ambient air conditions that will maintain the solid state of the cakes,
and retaining the thus packaged cakes under ambient air conditions that will maintain the solid state of the cakes.

References Cited

UNITED STATES PATENTS

| | | | |
|---|---|---|---|
| 663,502 | 12/1900 | Lain | 99—192 |
| 2,860,988 | 11/1958 | Keville | 99—55 |

RAYMOND N. JONES, *Primary Examiner.*

S. E. HEYMAN, *Assistant Examiner.*